(12) United States Patent
Wu

(10) Patent No.: US 8,611,316 B2
(45) Date of Patent: Dec. 17, 2013

(54) COMMUNICATION METHOD AND SYSTEM FOR TERMINAL ENTERING AND LEAVING IDLE MODE

(75) Inventor: Jianjun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1590 days.

(21) Appl. No.: 12/113,703

(22) Filed: May 1, 2008

(65) Prior Publication Data

US 2008/0259889 A1    Oct. 23, 2008

Related U.S. Application Data

(63) Continuation of application No. PCT/CN2006/002959, filed on Nov. 3, 2006.

(30) Foreign Application Priority Data

Nov. 3, 2005 (CN) .......................... 2005 1 0119515

(51) Int. Cl.
  *H04W 4/00* (2009.01)
  *G08C 17/00* (2006.01)
  *H04B 7/00* (2006.01)
  *H04W 68/00* (2009.01)
  *H04M 3/00* (2006.01)

(52) U.S. Cl.
  USPC ........... 370/338; 370/311; 370/310; 455/458; 455/418

(58) Field of Classification Search
  USPC .......................................................... 370/338
  See application file for complete search history.

(56) References Cited

U.S. PATENT DOCUMENTS

| | | | |
|---|---|---|---|
| 6,259,908 B1* | 7/2001 | Austin | 455/411 |
| 2005/0277417 A1* | 12/2005 | Yoon et al. | 455/436 |
| 2006/0025134 A1 | 2/2006 | Cho et al. | |
| 2006/0099972 A1* | 5/2006 | Nair et al. | 455/458 |
| 2006/0117111 A1 | 6/2006 | Sudo | |

(Continued)

FOREIGN PATENT DOCUMENTS

| | | |
|---|---|---|
| CN | 1385037 A | 12/2002 |
| CN | 1802024 A1 | 7/2006 |

(Continued)

OTHER PUBLICATIONS

Written Opinion of the International Searching Authority in corresponding PCT Application No. PCT/CN2006/002959 (Feb. 22, 2007).

(Continued)

*Primary Examiner* — Noel Beharry
(74) *Attorney, Agent, or Firm* — Leydig, Voit & Mayer, Ltd.

(57) ABSTRACT

A communication method and system for terminal entering and leaving idle mode in a mobile communication system are disclosed. The communication method for a terminal entering an idle mode includes: triggering a flow of entering the idle mode for the terminal; and a serving access service network gateway sending the information of anchor function entities serving the terminal to an anchor function entity information storing unit, so as to store the information. With the technical scheme of the invention, when the anchor function entities serving the terminal are not located at the same physical entity, the addressing process can be accomplished correctly, and the smoothness of the network service flow can be guaranteed.

2 Claims, 6 Drawing Sheets

(56) References Cited

U.S. PATENT DOCUMENTS

| | | |
|---|---|---|
| 2007/0191031 A1* | 8/2007 | Mohanty et al. .............. 455/458 |
| 2008/0153491 A1 | 6/2008 | Cho et al. |
| 2008/0205319 A1 | 8/2008 | Wu et al. |
| 2008/0227458 A1 | 9/2008 | Wu |
| 2008/0242341 A1 | 10/2008 | Wu et al. |

FOREIGN PATENT DOCUMENTS

| | | |
|---|---|---|
| CN | 1960567 B | 4/2010 |
| EP | 1313340 A1 | 5/2003 |
| EP | 1 956 787 A1 | 8/2008 |
| EP | 1 971 168 A1 | 9/2008 |
| KR | 10-0375914 B1 | 3/2003 |
| WO | WO 01/17282 A2 | 3/2001 |
| WO | WO 2005/053249 A1 | 6/2005 |
| WO | WO 2006/073228 A1 | 7/2006 |

OTHER PUBLICATIONS

International Search Report in corresponding PCT Application No. PCT/CN2006/002959 (Feb. 22, 2007).

$1^{st}$ Office Action in corresponding European Application No. 06805160.6 (May 6, 2009).

$2^{nd}$ Office Action in corresponding European Application No. 06805160.6 (Aug. 3, 2011).

"IEEE Std 802.16e—Part 16: Air Interface for Fixed and Mobile Broadband Wireless Access Systems, Amendment 2: Physical and Medium Access Control Layers for Combined Fixed and Mobile Operation in Licensed Bands and Corrigendum 1," IEEE Standard for Local and metropolitan area networks, Feb. 28, 2006, Institute of Electrical and Electronic Engineers, New York, New York.

"Stage 2: Architecture Tenets, Reference Model and Reference Points," WiMAX End-to-End Network Systems Architecture, Dec. 15, 2005, Draft, WiMAX Forum Proprietary, Beaverton, Oregon.

Aboba, "A Model for Context Transfer in IEEE 802," *IETF Standard Working Draft* (Oct. 15, 2003) http://draft-aboba-context-802-00.txt.

IEEE, "Part 16: Air Interface for Fixed and Mobile Broadband Wireless Access Systems. Amendments for Physical and Medium Access Control Layers for Combned Fixed and Mobile Operation in Licensed Bands, 802.16e D12," *IEEE Standard for Local and Metropolitan Area Networks* (Oct. 14, 2005) http://www.ieee802.org/16.

Koodli et al., "Idle Mode Handover Support in IPv6 Networks," *IETF Standard Working Draft* (Jul. 13, 2001) http://draft-koodli-idle-mode-ctv6-00.txt.

* cited by examiner

COMMUNICATION METHOD AND SYSTEM FOR TERMINAL ENTERING AND LEAVING IDLE MODE

CROSS-REFERENCE TO RELATED APPLICATIONS

This application is a continuation of International Patent Application No. PCT/CN2006/002959, filed Nov. 3, 2006, which claims priority to Chinese Patent Application No. 200510119515.4, filed on Nov. 3, 2005, entitled "Communication Method and System for Terminal Entering and Leaving Idle Mode," both of which are hereby incorporated by reference in their entirety.

FIELD OF THE TECHNOLOGY

The present invention relates to a mobile communication technology, and more particularly to a communication method and system for terminal entering and leaving idle mode in a mobile communication system.

BACKGROUND OF THE INVENTION

An idle mode is a terminal working mode in mobile broadband wireless access system defined by IEEE 802.16e standard. In the idle mode, the terminal may move in a given area and receive downlink broadcast service messages every a certain period, through which the terminal is informed by the system whether there is a downlink service to be sent. The terminal does not have to register with a base station of this cell when roaming in this area. At the same time, no operation flow, such as switching, need to be performed when the terminal roams to a different cell, thereby facilitating saving power and air interface resources of the terminal.

In this scheme, a plurality of base stations constitute a paging group, so as to form a consecutive area, in which the terminal does not necessarily send an uplink service, but may determine whether there is any downlink service to be sent to it at the network side through a downlink paging path. The paging group should be large enough to ensure that most of the terminals remain in the range of the same paging group for a long time, thus avoiding a frequent location updating. Also, the paging group should be small enough to ensure that the cost for paging the terminals in a paging group is reasonable.

In a normal connection mode with a certain serving base station, the terminal may request to enter the idle mode by sending a message, and the serving base station may also actively require the terminal to enter the idle mode by sending a message.

The currently formulated worldwide interoperability for microwave access (WiMAX) standard defines a paging reference model in the idle mode, as shown in FIG. 1. FIG. 1 is a schematic structural view of a WiMAX paging network. It can be seen from the figure that, a paging controller is a network entity that controls the idle mode activity of the terminal, which is a logical entity in the current WiMAX network architecture and has a close relationship with another logical entity, namely, authenticator (it may be realized in the same physical network element with the authenticator). The paging controller may be located in a physical network element of the WiMAX network, namely, access service network gateway (ASN-GW), and may also be located in another independent physical network element. Furthermore, the paging controller needs to initiate a paging process according to the paging group in which the terminal is currently located, and thus a location register is required to store state information of the terminal, paging information, and service flow related information. In general, a logical entity of the paging controller is corresponding to a logical entity of the location register, and both logical entities are realized in the same physical network element.

In the WiMAX network architecture, the authenticator, the paging controller, and the location register currently mentioned are a logical function entity, and belong to a functional portion of the ASN-GW. In the current paging solution, it deems that when the terminal is in the idle mode, the authenticator and the paging controller do not change, and it deems that after the terminal enters the idle mode, an anchor authenticator that stores the terminal key information and an anchor paging controller do not change, although physically, in the idle mode, the terminal may move to the physical dominion of another paging controller and authenticator. If the paging controller and the authenticator are realized on the same physical entity, when the terminal enters the idle mode or leaves the idle mode, or performs a location updating, the terminal can store or obtain a message to or from both the paging controller and the authenticator as long as interacting with the physical entity, thereby accomplishing the related management of the terminal in the idle mode.

When the mode of the terminal changes or a network switching is performed, various function entities corresponding to the terminal, which currently serve the terminal, become anchor entities, such as an anchor authenticator, an anchor paging controller, an anchor data path function, an anchor foreign agent, an anchor service flow authorization (anchor SFA) entity, a dynamic host configuration protocol proxy (DHCP proxy) entity, an anchor accounting client, and the like.

For the above function entities, by the movement of the terminal, since the moments of the function entities serving each terminal MS trigger a change respectively are different, the above various function entities serving a particular terminal MS, such as the anchor authenticator, the foreign agent FA, the anchor SFA, the anchor proxy mobile IP client (anchor PMIP client), and the like, may exist in different ASN-GWs, and therefore, interactions between different ASN-GWs would be involved in one activity.

It should be noted that, the above function entities exist within each access service network (ASN). When a subscriber terminal MS accesses the network, the function entities serving the subscriber terminal MS exist in the serving ASN, and the function entities may migrate along with the movement of the MS, the optimization of the network resources, and other reasons. It should be noted that, the migration herein refers to the migration of the function entities serving the MS, i.e., the migration of the anchor function entities of the MS mentioned in the present invention rather than the function entities themselves. That is to say, although each ASN has same function entities, it may not provide services for the MS at this time. The migration may result in various function entities serving the MS being distributed in a plurality of ASNs.

Thus, in the rang of a network access provider, after the terminal enters the idle mode, as the terminal moves, even if the aforementioned anchor paging controller, anchor authenticator, anchor foreign agent, anchor data path function, anchor proxy mobile node, and other logical function entities are realized in the same physical entity, due to different trigger factors and moments for changing the above function entities during the movement, the terminal would be under a particular base station in the idle mode because of the movement. Physically, the base station is connected with a new authenticator and a new paging controller and foreign agent, but the anchor paging controller, anchor authenticator, anchor foreign agent, anchor data path function, and anchor proxy mobile node are not in the same network physical entity.

As shown in FIG. 1, a schematic structural view of a WiMAX paging network without considering other physical network elements and logical entities in the WiMAX network is shown. The ASN-GW 300 is a current ASN-GW of the terminal, the ASN-GW 500 is an anchor foreign agent of the terminal, and the ASN-GW 400 is the ASN-GW in which an anchor paging controller and an anchor authenticator of the terminal are located.

The information should be sent to the anchor paging controller when the terminal enters the idle mode, and the anchor paging controller then finds an associated location register to store the information, so that when the terminal experiences a location updating under some base station in the idle mode, or leaves the idle mode, it should know the specific information of the anchor paging controller, the anchor authenticator, the anchor data path function, and the anchor foreign agent serving the terminal, so as to accomplish functions in corresponding entities. For example, when performing the location updating, the key information should be obtained from the anchor authenticator, for validating legality of the current location updating message; when leaving the idle mode, a corresponding session message, including the information of the anchor foreign agent, the anchor data path function, and the anchor proxy mobile node, should be obtained from the anchor paging controller/location register, thereby establishing a data path corresponding to the terminal. However, the prior art cannot ensure that the above information may be acquired accurately when the terminal enters or leaves the idle mode.

The aforementioned anchor data path function is typically located in the same physical entity with the anchor foreign agent, and sometimes, the concepts of the two logical entities are not mentioned individually, but only the concept of the anchor foreign agent or the anchor data path function is mentioned.

SUMMARY OF THE INVENTION

Embodiments of the present invention is directed to a communication method and system for a terminal idle mode when anchor function entities of the terminal are not in the same physical entity, for solving the problem in the prior art that, when the terminal is in the idle mode, if the anchor function entities being acquired are not in the same physical entity, it cannot guarantee to accurately acquire the information of the anchor function entities while the terminal is entering or leaving the idle mode.

An embodiment of the present invention provides a communication method for terminal entering idle mode, which includes: a flow of entering the idle mode for the terminal is triggered; a serving access service network gateway (ASN-GW) sends information of anchor function entities serving the terminal to an anchor function entity information storing unit for storage.

An embodiment of the present invention provides a communication system for terminal entering idle mode, in which the terminal accesses network side through a serving base station. The system includes an entering idle mode triggering unit adapted to trigger a flow of entering the idle mode for the terminal; an anchor function entity information sending unit located in a serving ASN-GW, and adapted to send information of anchor function entities serving the terminal to an anchor function entity information storing unit for storage; and an anchor function entity information storing unit adapted to store the information of the anchor function entities of the terminal.

An embodiment of the present invention provides a communication method for terminal leaving idle mode, which includes: a flow of leaving the idle mode for the terminal is triggered to perform a network re-access; the serving base station acquires session information of the terminal from an ASN-GW in which an anchor paging controller of the terminal is located, and the session information carries the information of the anchor function entities of the terminal; the serving base station establishes a service transmission path from the terminal to a home agent according to the session information of the terminal.

An embodiment of the present invention provides a communication system for terminal leaving idle mode, in which the terminal accesses network side through a serving base station. The system includes a leaving idle mode triggering unit adapted to trigger a flow of leaving the idle mode for the terminal to perform a network re-access; a terminal session information acquiring unit located in the serving base station, adapted to acquire session information of the terminal from an ASN-GW in which an anchor paging controller of the terminal is located, the information of the anchor function entities of the terminal being carried in the session information; and the serving base station adapted to establish a service transmission path from the terminal to a home agent according to the session information of the terminal.

With the technical scheme of the invention, when the anchor function entities serving the terminal are not located at the same physical entity, addressing can be accomplished correctly, thus ensuring the smoothness of the network service flow.

DETAILED DESCRIPTION OF THE EMBODIMENTS

Figure 1:
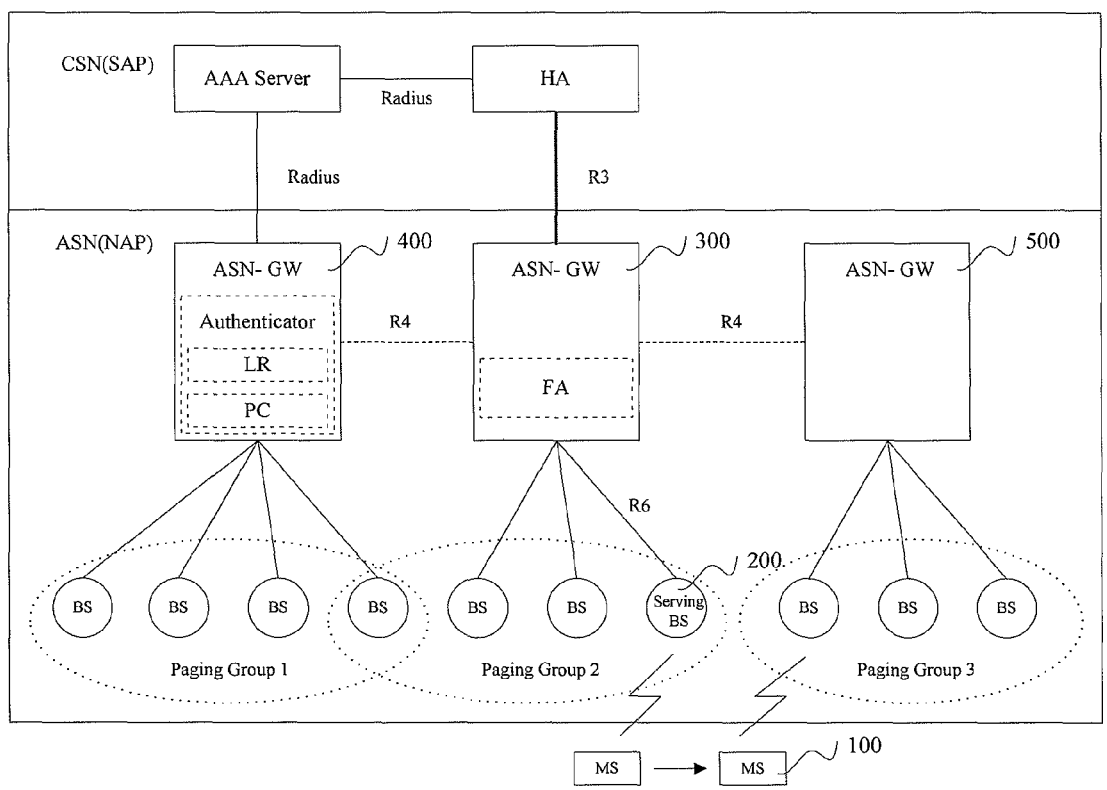
FIG. 1 is a diagram of a conventional WiMAX paging model.

As shown in FIG. 1, in a WiMAX paging reference model, an access service network (ASN) includes network elements such as an access service network gateway (ASN-GW) 300, an ASN-GW 400, and an ASN-GW 500, each corresponding to several base stations. When a terminal 100 actively requests to an serving base station 200 for entering an idle mode, or the serving base station 200 instructs the terminal to enter the idle mode, a paging controller on the network element of the ASN-GW 400 is informed that the terminal enters the idle mode, and state information of the terminal, paging information, and service flow information are stored in a location register of the network element of the ASN-GW 400, through the message interaction between the terminal 100 and the serving base station 200, and between the serving base station 200 and the backend network element ASN-GW 300. The terminal may carry the information required to be reserved when it enters the idle mode in a request message for the idle mode sent to the serving base station 200, and the serving base station 200 may also set similar information in a response message for the idle mode request to inform the terminal 100 the related information reserved in the location register, and inform the terminal the identification of the paging controller. Furthermore, after the terminal enters the idle mode, an interface R4 between corresponding network elements of the ASN-GW and an interface R6 between the base station and the network element of the ASN-GW should be released.

When the terminal moves or the mode thereof changes, the information of various anchor function entities acting on it is unique, and therefore, as long as the information is found correctly, addressing could be performed correctly, thereby accomplishing corresponding operations. The information includes anchor authenticator information, anchor foreign agent information, anchor location register information, anchor paging controller information, anchor proxy mobile node information, anchor service flow authorization entity information, anchor data path function information, and the like, which can be collectively referred to as the information of the anchor function entities of the terminal in the scheme of the present invention.

To further understand the processing method for the terminal in the idle mode of the present invention, the cases of the terminal entering and leaving the idle mode are illustrated, respectively.

As the terminal is moving, the current serving base station thereof always knows the identification information of the anchor authenticator of the terminal. The terminal exchanges messages with the current serving base station when it enters a normal service communication in a particular network service area, so the current serving base station knows the anchor authenticator identification and other information. When a switching occurs when the terminal moves, the information is transmitted to a new base station as a part of the session information of the terminal. Therefore, before entering the idle mode, the current serving base station of the terminal always knows the identification information of the anchor authenticator serving the terminal.

Figure 2:
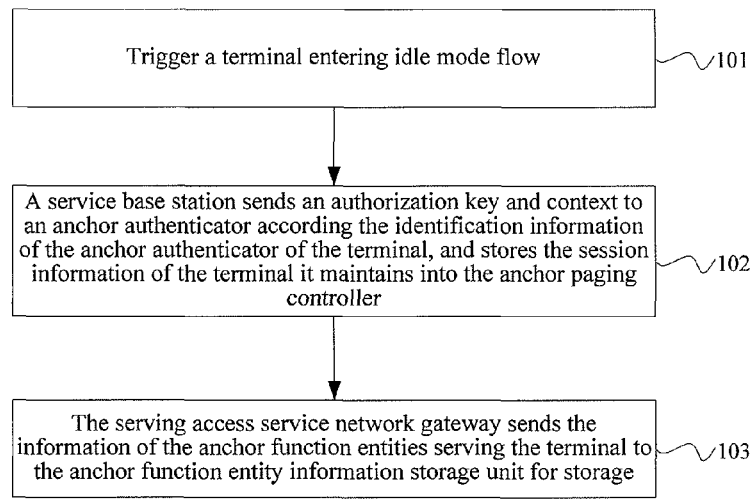
FIG. 2 is a flowchart of a processing method of a network terminal entering idle mode according to an embodiment of the present invention.

As shown in FIG. 2, a flowchart of a processing method for terminal entering idle mode is shown, which includes the following steps.

In step 101, a flow of entering the idle mode for the terminal is triggered.

The flow of entering the idle mode may be triggered in two ways, when the terminal is required to enter the idle mode.

Trigger the flow by terminal side, in which a registration request message is sent to the serving base station to trigger the flow of entering the idle mode for the terminal.

Trigger the flow by network side, in which the serving base station sends, at the network side, a request message to the terminal, so as to actively require the terminal to enter the idle mode.

The scheme of the embodiments of the present invention may employ either mode to trigger the flow of entering the idle flow for the terminal.

In step 102, the serving base station sends the authorization key and context to the anchor authenticator according to the known identification information of the anchor authenticator of the terminal, and stores the session information of the terminal it maintains into the anchor paging controller through the serving ASN-GW, the session information of the terminal includes CID, SAID, SFID, and the like.

In step 103, the serving ASN-GW sends the information of the anchor function entities serving the terminal to an anchor function entity information storing unit for storage.

In the above scheme, the identifications of the anchor authenticator, the anchor foreign agent, the anchor proxy mobile node, the anchor service flow authorization entity, the anchor data path function refer to an IP address, or an MAC address, or a network identification of a physical network element in which the anchor authenticator, the anchor foreign agent, the anchor proxy mobile node, the anchor service authorization entity, and the anchor data path function are located in, respectively.

In this step, the anchor function entity information storing unit is an anchor paging controller, or an anchor location register.

In the above method, the storing, by the anchor paging controller, the information of the anchor function entities includes the following steps.

The serving base station forwards the information of the anchor function entities to the ASN-GW in which the anchor paging controller is located through the relay paging controller located in the serving ASN-GW; and stores the information of the anchor function entities in the anchor paging controller.

According to the network structure, if the anchor paging controller and the anchor authenticator are not located in the same physical entity, the anchor paging controller further sends the terminal security context it obtained to the anchor authenticator for storage.

In the above method, the process of the anchor paging controller storing the information of the anchor function entities may also be as follows.

After the serving base station receives a request message for the terminal entering the idle mode, the serving ASN-GW stores the information of the anchor function entities through the anchor foreign agent.

The ASN-GW in which the anchor foreign agent is located forwards the information of the anchor function entities to the ASN-GW in which the anchor paging controller is located; and stores the information of the anchor function entities in the anchor paging controller.

According to the network structure, if the anchor paging controller and the anchor authenticator are not located in the same physical entity, the anchor paging controller may further send the terminal security context it obtained to the anchor authenticator for storage.

In the storing process, the anchor foreign agent also records the identification information of the anchor paging controller, and/or records the state information of the terminal entering the idle mode, i.e., records whether the terminal is at the idle mode state currently or not, so as to correctly perform the addressing.

In the above step 102, the authorization key and context also belong to the session information of the terminal, and should be stored in the anchor authenticator after the terminal enters the idle mode, so as to obtain the authorization key and context information from the anchor authenticator for verifying the legality of the related management message when the terminal makes a location updating in the idle state or leaves the idle mode subsequently.

In the above step 103, the identification of anchor authenticator, and/or the identification information of the anchor foreign agent, and/or the anchor proxy mobile node, and/or the anchor service flow authorization entity, and/or the anchor data path function may also be stored in a corresponding location register found by the anchor paging controller.

In the above scheme, if the anchor authenticator and the anchor paging controller are located in the same physical network element, the serving base station receives the request message for the terminal entering the idle mode and validates the legality of the request message, and then sends the authorization key and context, and/or the information of the anchor function entities for the terminal to the physical network element in which the anchor authenticator and the anchor paging controller are located for storage.

Figure 3:
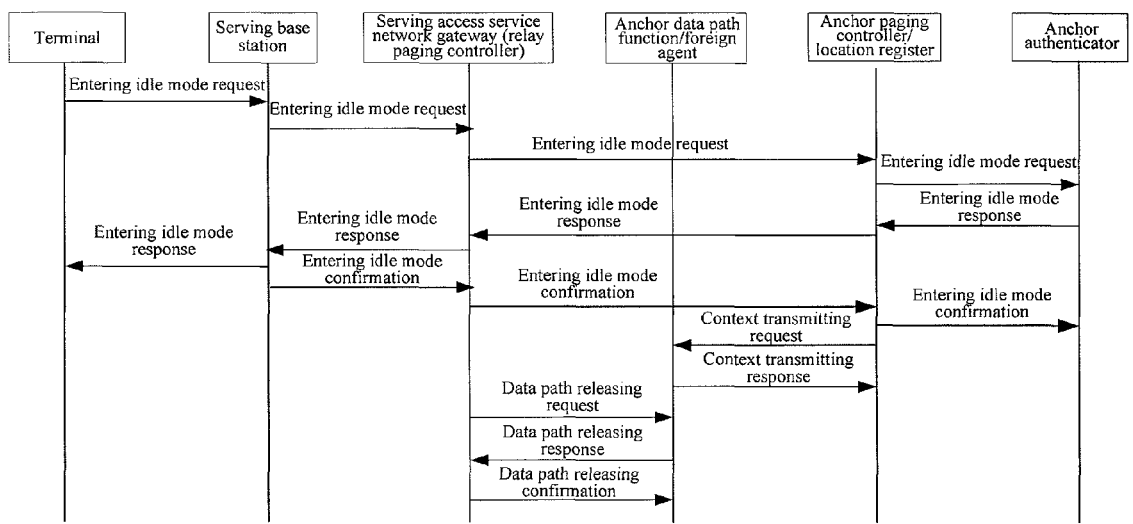
FIG. 3 is a flowchart of a specific example of terminal entering idle mode according to an embodiment of the present invention.

As shown in FIG. 3, a flowchart of a specific example of terminal entering idle mode is shown, in which some function units without being used directly are omitted. It can be seen from the figure that, after the terminal initiates a request for entering the idle mode, and the serving ASN-GW sends the information of the anchor function entities serving the terminal to the anchor function entity information storing unit for storage, the anchor paging controller returns a response message for entering the idle mode to the serving ASN-GW in which the relay paging controller is located, and the message carries paging parameters to be informed to the terminal entering the idle mode and the identification of the anchor paging controller of the terminal. The message is further forwarded to the serving base station. After the serving base station returns the response message for entering the idle mode for the terminal, the serving base station returns a confirmation message for entering the idle mode to the serving ASN-GW in which the relay paging controller is located, and the message carries the latest CMAC_Key_Count updated by the base station. The serving ASN-GW further forwards this context to the anchor authenticator for storage. In the process, the forwarding may be performed through the anchor paging controller, and the anchor authenticator decides whether to update the CMAC_KEY_COUNT or not according to a CMAC verification result.

Figure 4:
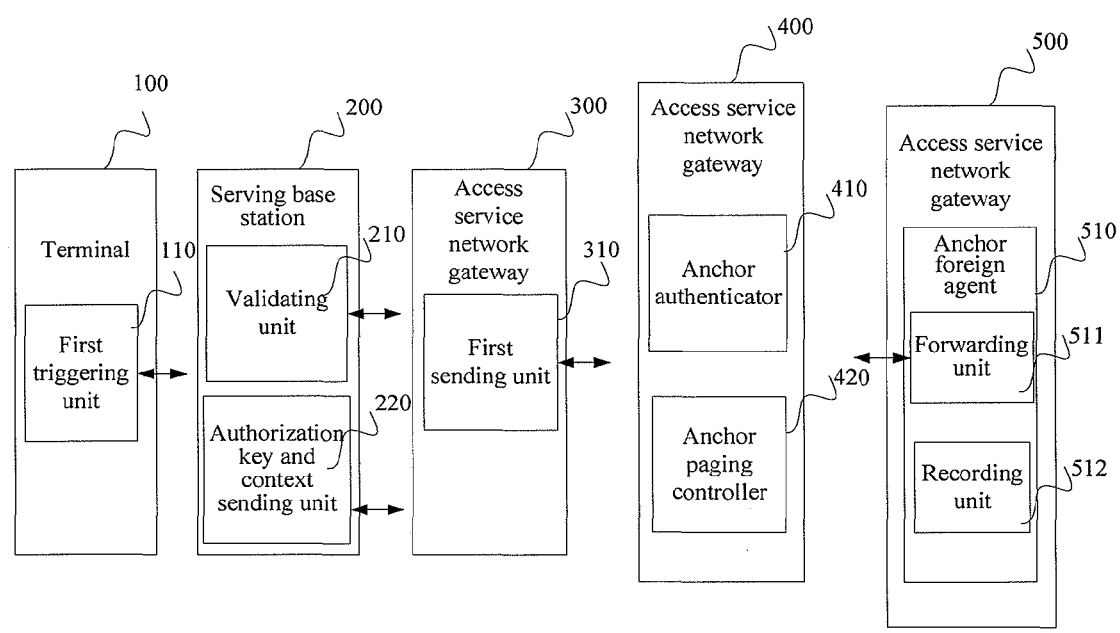
FIG. 4 is a schematic view of a communication system of terminal entering idle mode according to an embodiment of the present invention.

As shown in FIG. 4, a communication system for terminal entering idle mode corresponding to the communication method for terminal entering idle mode is shown. It can be seen from the figure that, the terminal accesses the network side through the serving base station. The system includes a first triggering unit 110, a first sending unit 310, and a first storing unit.

The first triggering unit 110 is adapted to trigger a flow of entering the idle mode for the terminal. The entering idle mode triggering unit 110 may be located in the terminal 100, or located in the serving base station 200 at the network side, and the present scheme employs the case of being located in the terminal 100 for illustration.

The first sending unit 310 is located in the serving ASN and disposed in the ASN-GW 300 in this embodiment, and adapted to send the information of the anchor function entities serving the terminal to an anchor function entity information storing unit for storage.

The first storing unit is adapted to store the information of the anchor function entities of the terminal.

In the above scheme, the first storing unit is an anchor paging controller or an anchor location register, and the present scheme employs the anchor paging controller for illustration.

In the present scheme, the anchor authenticator 410 and the anchor paging controller 420 serving the terminal are located in the same ASN-GW.

The system of the present invention also includes a validating unit 210, an authorization key and context sending unit 220, a forwarding unit 511, and the anchor paging controller 420.

The validating unit 210 is located in the serving base station 200, and adapted to validate legality of a request message for the terminal 100 entering the idle mode after the serving base station 200 receives the request message.

The authorization key and context sending unit 220 is located in the serving base station 200, and adapted to send the authorization key and context for the terminal 100 to the physical network element in which the anchor authenticator 410 and the anchor paging controller 420 are located for storage.

The forwarding unit 511 is located in the ASN-GW 500 in which the anchor foreign agent 510 is located, and adapted to forward the information of the anchor function entities stored through the anchor foreign agent 510 by the ASN-GW 300 to the ASN-GW 400 in which the anchor paging controller 420 is located.

The anchor paging controller 420 is adapted to receive and store the information of the anchor function entities.

The system further includes a recording unit 512.

The recording unit 512 is located in the anchor foreign agent 510, and adapted to record the identification information of the anchor paging controller, and/or record the state information of the terminal entering the idle mode.

In the process of the terminal leaving the idle mode, the identification information of the anchor function entities stored by the anchor paging controller should be returned to the serving connection service network entity connected when the terminal leaves the idle mode, including the serving base station and/or the serving connection service network gateway. Therefore, after the terminal leaves the idle mode, a communication connection is established between the serving connection service network of the terminal and each anchor network.

Figure 5:
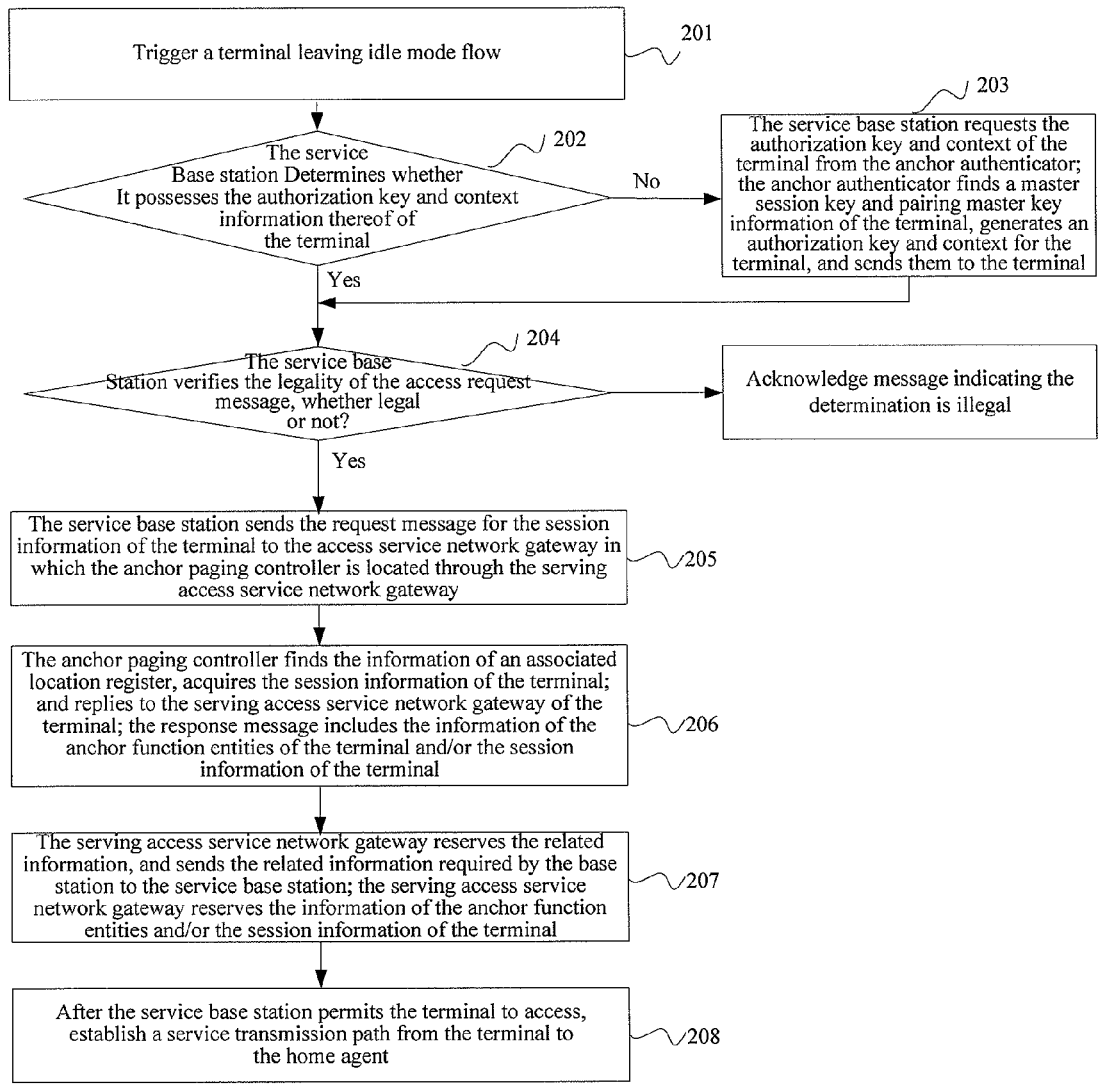
FIG. 5 is a flowchart of a processing method of network terminal leaving idle mode according to the present invention.

As shown in FIG. 5, a flowchart of a processing method of terminal leaving idle mode is shown, which includes the following steps.

In step 201, a flow of leaving the idle mode for the terminal is triggered to perform a network re-access.

This step may be triggered by the terminal, and may also be triggered by the network side. The present embodiment employs the terminal triggering.

The terminal sends an access request message to the serving base station, requiring leaving the idle mode to perform a network re-access, and the message carries the identification information of the anchor paging controller. At the same time, the terminal regenerates an authorization key and context according to its current master management key and the identification of the current base station, thereby carrying a hash-based message authentication code (HMAC) in the access request message.

In step 202, the serving base station determines whether it possesses the authorization key and context information of the terminal that can be used to verify the legality of the received access request message or not, after receiving the access request messages. If so, the step 204 is performed; or otherwise, the step 203 is performed.

In step 203, the serving base station requires the authorization key and context of the terminal from the anchor authenticator through the serving ASN-GW according to the obtained information of the anchor authenticator serving the terminal, so as to verify the legality of the received access request message. After receiving a request for the authorization key and context, the anchor authenticator finds a master session key and pairing master key information of the terminal according to the identification information of the terminal, generates an authorization key and context for the terminal according to the identification of the current serving base station, and sends them to the terminal through an authorization key transmission message.

In step 204, the serving base station verifies the legality of the access request message according to the authorization key and context information of the terminal. If legal, the step 205 is performed; or otherwise, an acknowledgement message indicating the determination is illegal is returned directly.

In step 205, the serving base station sends a request message for the session information of the terminal through the serving ASN-GW to the ASN-GW in which the anchor paging controller is located.

In step 206, after the anchor paging controller receives the request message for the session information of the terminal, the anchor paging controller finds the information of an associated location register, obtains the session information of the terminal from the location register, and replies to the serving ASN-GW of the terminal through an response message for the terminal session information request. The response message includes the information of the anchor function entities of the terminal and/or the session information of the terminal.

In this step, the information of the anchor function entities of the terminal may include the identification of the anchor authenticator, and/or the identification of the anchor foreign agent, and/or the identification of the anchor proxy mobile node.

In this step, the session information of the terminal may include CID, SFID, QoS information of the serving flow, and the like.

In step 207, after receiving the above session information of the terminal, the serving ASN-GW reserves the related information, and sends the related information required by the base station to the serving base station. The serving ASN-GW reserves the information of the anchor function entities and/or the session information of the terminal. The related information required by the base station includes the identification of the anchor authenticator, and/or the CID possessed by the terminal, and/or the SFID possessed by the terminal, and/or the QoS information of the service flow possessed by the terminal.

In step 208, after the serving base station permits the terminal to access, a service transmission path from the terminal to a home agent is established, including a data carrying path between the serving base station and the serving ASN-GW, and a path between the serving ASN-GW and the anchor ASN-GW. The details are described below.

The serving base station sends a request message for data path establishment to the serving ASN-GW, requesting to establish the data carrying path between the serving base station and the serving ASN. The identification of the ASN-GW in which the anchor foreign agent is located and/or the identification of the anchor proxy mobile node are carried in the message.

The serving ASN-GW sends the request message for data path establishment to the ASN-GW in which the anchor foreign agent is located, requesting to establish the data carrying path for the terminal between the two.

The ASN-GW in which the anchor foreign agent is located returns an acknowledgement message for the data path establishment to the serving ASN-GW, and the serving ASN-GW returns the acknowledgement message for the data path establishment to the serving base station.

The serving base station returns an acknowledgement message for the request for the terminal leaving the idle mode, and carries the HMAC according to the format defined by the IEEE 802.16e protocol, and the network re-access process of the air interface is accomplished through interaction with the terminal.

The serving base station returns a confirmation message for data path establishment to the serving ASN-GW, and the ASN-GW returns the confirmation message for data path establishment to the anchor foreign agent.

In the above scheme, if the data path between the anchor foreign agent and the home agent is released when the terminal enters the idle mode, the establishing the data transmission path from the terminal to the home agent further includes establishing the data path between the anchor foreign agent and the home agent, and the details are described below.

The anchor foreign agent sends a request message for establishing a path between the anchor foreign agent and the home agent to the anchor proxy mobile node, according to the obtained identification of the anchor proxy mobile node.

The anchor proxy mobile node makes a mobile IP registration for the terminal, and establishes the data path between the anchor foreign agent and the home agent, after receiving the request message.

As such, when the terminal is in the idle mode, the information of the anchor authenticator, anchor foreign agent, anchor proxy mobile node, and other anchor function entities related to the terminal is stored in the anchor paging controller or the anchor location register, so when the terminal requires leaving the idle mode and entering a normal service network, the related information can be quickly and accurately found, so as to accomplish a correct operation.

Figure 6:
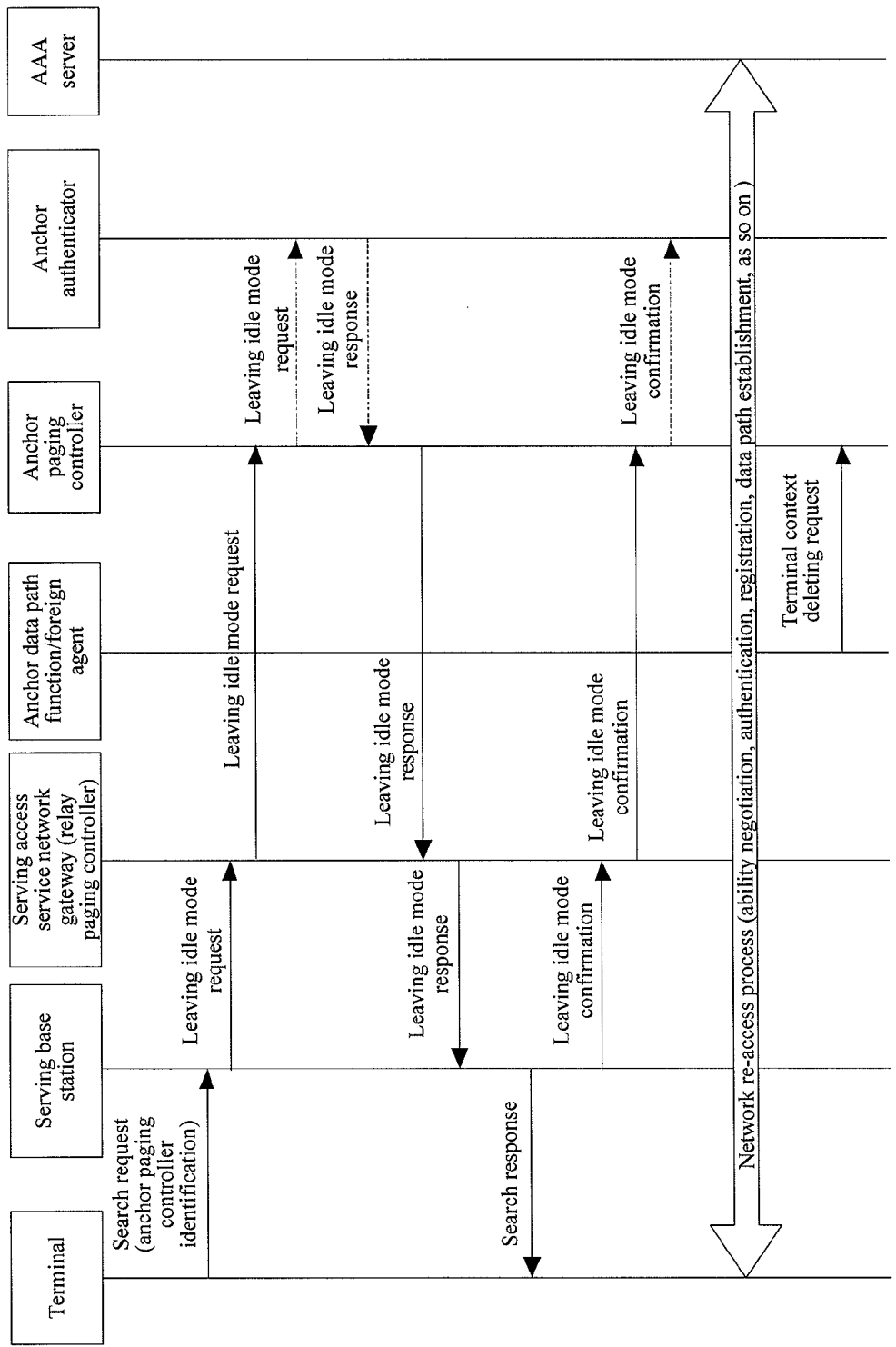
FIG. 6 is a flowchart of a specific example of terminal leaving idle mode according to an embodiment of the present invention.

As shown in FIG. 6, a specific example flow of terminal leaving idle mode is shown. In process of the terminal leaving the idle mode, the identification information of the anchor function entities stored by the anchor paging controller should be returned to the serving connection service network entity connected when the terminal leaves the idle mode, including the serving base station and/or the serving connection service network gateway. Therefore, after the terminal leaves the idle mode, a communication connection is established between the serving connection service network of the terminal and each anchor connection service network. It can be seen from the figure that, the example flow mainly includes the following steps.

After receiving a search request from the terminal, the serving base station acquires context information stored in the anchor paging controller when the terminal entered the idle mode from the anchor paging controller through the relay paging controller in the serving connection service network gateway according to the information of the anchor paging controller carried in the search request message, including security context information and identification information of the anchor function entities.

The serving base station receives a response message for entering the idle mode with the terminal context information, sends a search response message to the terminal, and then sends a confirmation message to the anchor paging controller through the connection service network gateway in which the relay paging controller is located. The message carries the information of leaving the idle mode successfully and the latest CMAC_KEY_Count value updated by the serving base station to be stored in the anchor authenticator.

The current serving base station of the terminal and the serving connection service network gateway perform the network re-access step with the terminal, according to the context information of the terminal and the identification information of the anchor function entities acquired by the above steps.

Figure 7:
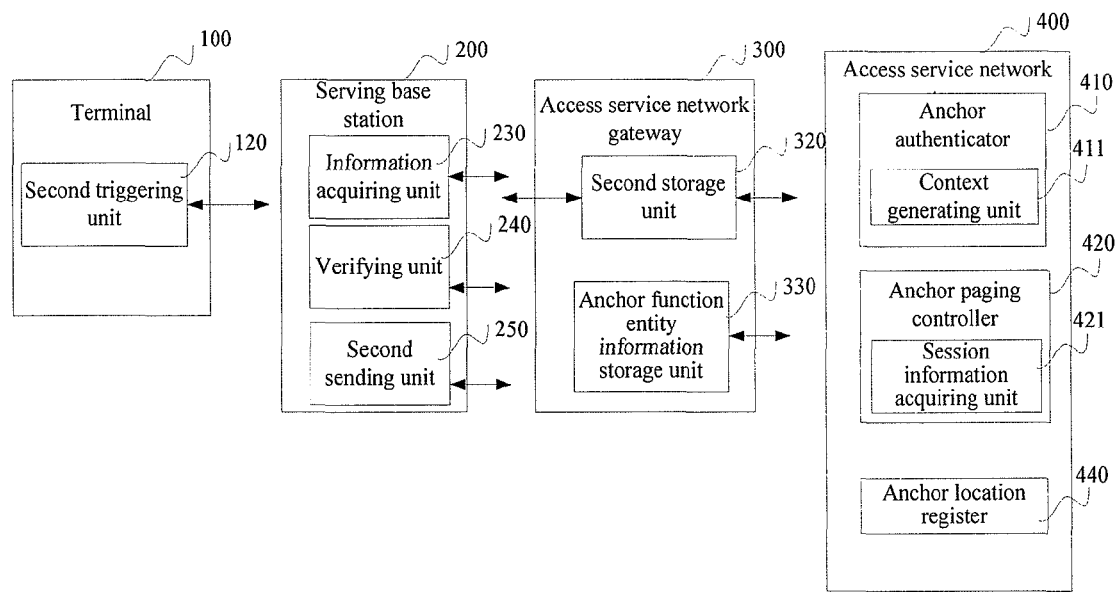
FIG. 7 is a schematic view of a communication system of terminal leaving idle mode according to an embodiment of the present invention.

As shown in FIG. 7, a communication system for terminal leaving idle mode corresponding to the communication method for terminal leaving idle mode is shown. It can be seen from the figure that, the terminal accesses the network side through the serving base station, and the system includes a second triggering unit 120, an information acquiring unit 230, and the serving base station 200.

The second triggering unit 120 is adapted to trigger a flow of leaving the idle mode for the terminal to perform a network re-access.

The second triggering unit 120 may be located in the terminal 100, and may also be located in the serving base station 200 at the network side, and the present scheme employs the case of being located in the terminal 100 for illustration.

The information acquiring unit 230 is located in the serving base station 200, and adapted to acquire the session information of the terminal 100 from the ASN-GW 400 in which the anchor paging controller 420 of the terminal is located. The session information carries the information of the anchor function entities of the terminal;

The serving base station 200 is adapted to establish a service transmission path from the terminal to the home agent according to the session information of the terminal.

The system further includes a verifying unit 240.

The verifying unit 240 is located in the serving base station 200, and adapted for the serving base station 200 to determine whether it possesses the authorization key and context information of the terminal for verifying the legality of the received access request message or not.

If so, the serving base station 200 verifies the legality of the access request message according to the authorization key and context information of the terminal 100.

If not, the anchor authenticator 410 generates and sends an authorization key and context to the terminal 100.

The system further includes a context generating unit 411.

The context generating unit 411 is located in the anchor authenticator 410, and adapted to find a master session key and pairing master key information of the terminal according to the terminal identification information, and generate and send an authorization key and context for the terminal 100 according to the identification of the current serving base station, after receiving a request for the authorization key and context.

The system further includes a second sending unit 250, a session information acquiring unit 421, and a second storing unit 320.

The second sending unit 250 is located in the serving base station 200, and adapted to send a request message for the session information of the terminal 100 to the ASN-GW 400 in which the anchor paging controller 420 is located through the ASN-GW 300.

The session information acquiring unit 421 is located in the anchor paging controller 420, and adapted to acquire the session information of the terminal 100 from an anchor location register 440 associated with the terminal, and replies to the serving ASN-GW 300 of the terminal through an response message; and The second storing unit 320 is located in the ASN-GW 300, and adapted to store related information, and send the related information required by the base station to the serving base station 200, after receiving the response message sent by the session information acquiring unit 421.

The system further includes an anchor function entity information storing unit 330.

The anchor function entity information storing unit 330 is located in the serving ASN-GW, and adapted to store the information of the anchor function entities, and/or the session information of the terminal, in which the information required by the base station includes the identification of the anchor authenticator, and/or the session information of the terminal.

As such, in the scheme of the this embodiment, when the terminal performs a location updating in the idle mode or leaves the idle mode, the information of the anchor authenticator, the anchor foreign agent, the anchor paging controller, the anchor proxy mobile node, and other anchor function entities of the terminal can be found correctly through the above method and system, and corresponding operations can be accomplished according to the above information, thereby ensuring the perform of the flow.

It is apparent that, those skilled in the art may make various changes and variations to the present invention without departing from the spirit and scope of the present invention. In this way, if these changes and variations of the present invention are within the scope of the accompanying claims and the equivalent of the present invention, these changes and variations are also intended to be included in the present invention.

What is claimed is:

1. A communication method for a terminal leaving an idle mode, the method comprising:

triggering a flow of the terminal leaving the idle mode to perform a network re-access;

acquiring, by a serving base station, session information of the terminal from an access service network gateway (ASN-GW) in which an anchor paging controller of the terminal is located, wherein the session information carries information of anchor function entities of the terminal, wherein the information of the anchor function entities is used for the terminal leaving the idle mode and re-accessing the network, and the information of the anchor function entities comprises at least one of: an Internet Protocol (IP) address of a physical network element in which an anchor authenticator is located, and an IP address of a physical network element in which an anchor foreign agent is located;

establishing, by the serving base station, a service transmission path from the terminal to a home agent according to the session information of the terminal;

wherein, before the acquiring, by the serving base station, the session information of the terminal from the ASN-GW in which the anchor paging controller of the terminal is located, the method further comprises:

verifying, by the serving base station, legality of a received access request message according to an authorization key and context information of the terminal;

wherein if the serving base station does not have the authorization key and context information of the terminal, an anchor authenticator generates and sends an authorization key and context to the terminal, wherein generating and sending an authorization key and context to the terminal comprises:

finding by the anchor authenticator a master session key and s pairing master key information of the terminal according to identification information of the terminal;

generating the authorization key and context for the terminal according to the identification of the current serving base station; and sending the authorization key and context to the terminal, after receiving a request for the authorization key and context.

2. The method according to claim 1, wherein the acquiring, by the serving base station, the session information of the terminal from the ASN-GW in which the anchor paging controller is located further comprises:

sending, by the serving base station, a request message for the session information of the terminal to the ASN-GW in which the anchor paging controller is located through the serving ASN-GW;

acquiring, by the anchor paging controller, the session information of the terminal from a location register associated with the terminal; and replying to the serving ASN-GW of the terminal through a response message;

reserving, by the serving ASN-GW, related information; and sending the related information required by the base station to the serving base station, after receiving the response message.

\* \* \* \* \*